(12) United States Patent
Pankratov

(10) Patent No.: US 10,436,032 B2
(45) Date of Patent: Oct. 8, 2019

(54) DAMPER RING

(71) Applicant: Pratt & Whitney Canada Corp., Longueuill (CA)

(72) Inventor: Maksim Pankratov, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 609 days.

(21) Appl. No.: 15/145,160

(22) Filed: May 3, 2016

(65) Prior Publication Data

US 2017/0321556 A1 Nov. 9, 2017

(51) Int. Cl.
*F01D 5/10* (2006.01)
*F02C 3/04* (2006.01)

(52) U.S. Cl.
CPC .............. *F01D 5/10* (2013.01); *F02C 3/04* (2013.01); *F05D 2220/32* (2013.01); *F05D 2250/182* (2013.01); *F05D 2250/183* (2013.01); *F05D 2250/184* (2013.01)

(58) Field of Classification Search
CPC ..................................... F01D 5/10; F01D 5/26
See application file for complete search history.

(56) References Cited

U.S. PATENT DOCUMENTS

| | | | |
|---|---|---|---|
| 4,817,455 A | 4/1989 | Buxe | |
| 4,848,182 A | 7/1989 | Novotny | |
| 5,373,922 A | 12/1994 | Marra | |
| 5,582,077 A * | 12/1996 | Agram | F01D 5/027 403/318 |
| 7,458,769 B2 | 12/2008 | Forgue et al. | |
| 8,328,519 B2 | 12/2012 | Denis | |
| 8,747,054 B2 * | 6/2014 | Witlicki | F01D 25/164 415/119 |
| 9,151,170 B2 | 10/2015 | El-Aini et al. | |
| 2013/0004313 A1 * | 1/2013 | El-Aini | F01D 5/10 416/134 R |
| 2014/0314578 A1 * | 10/2014 | Xu | F01D 5/10 416/220 R |

* cited by examiner

*Primary Examiner* — Christopher Verdier
*Assistant Examiner* — Michael L Sehn
(74) *Attorney, Agent, or Firm* — Norton Rose Fulbright Canada LLP

(57) ABSTRACT

A damper ring is mounted in frictional engagement with a radially inwardly facing surface of a circumferential groove defined in a rotary part of a gas turbine engine. Energy dissipation is provided via sliding friction of the ring in the groove. The damper ring has a circumferentially segmented ring body having a non-uniform circumferential stiffness around its circumference including a locally reduced stiffness in a circumferential direction between each pair of circumferentially adjacent ring segments.

9 Claims, 7 Drawing Sheets

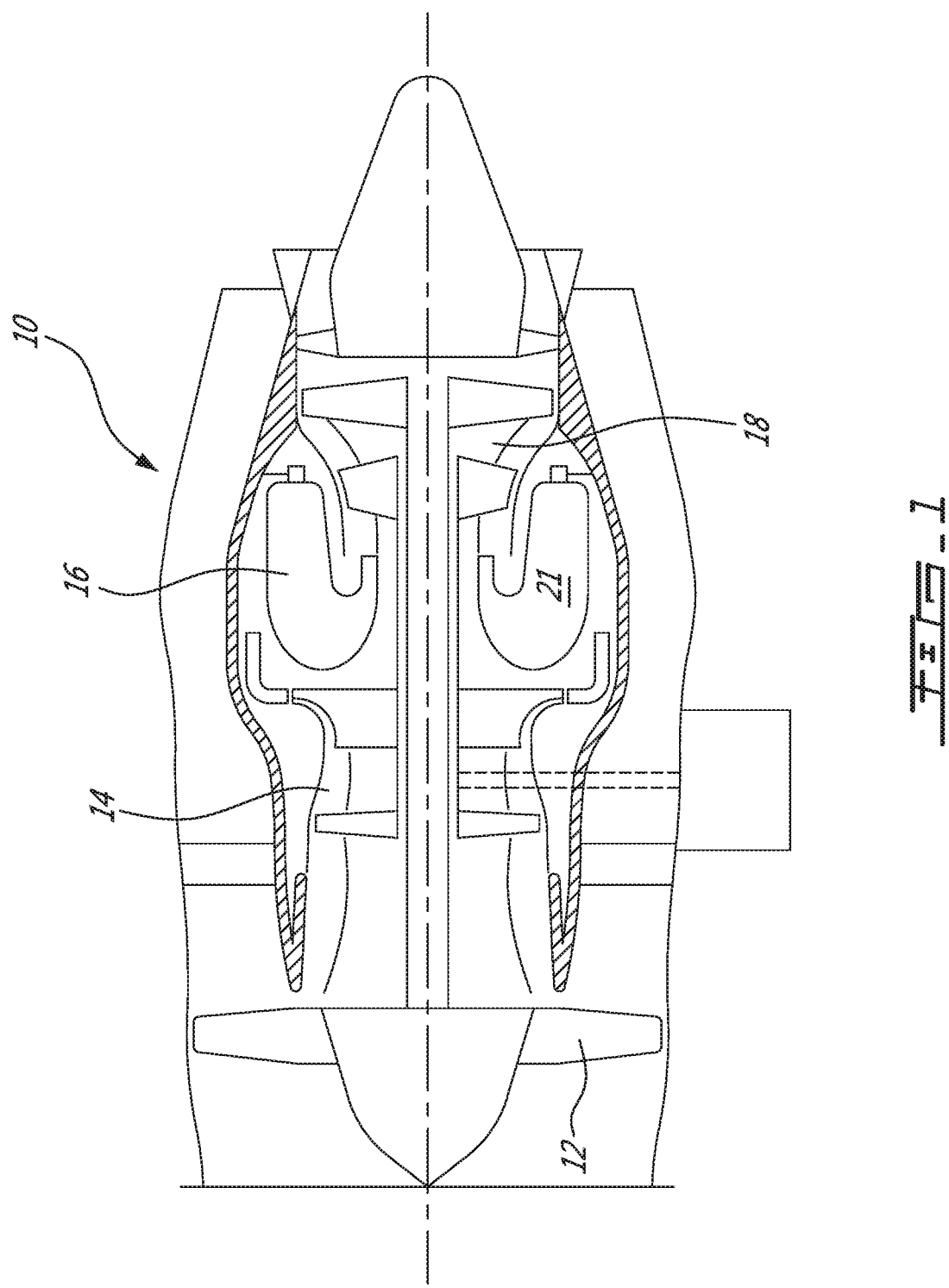

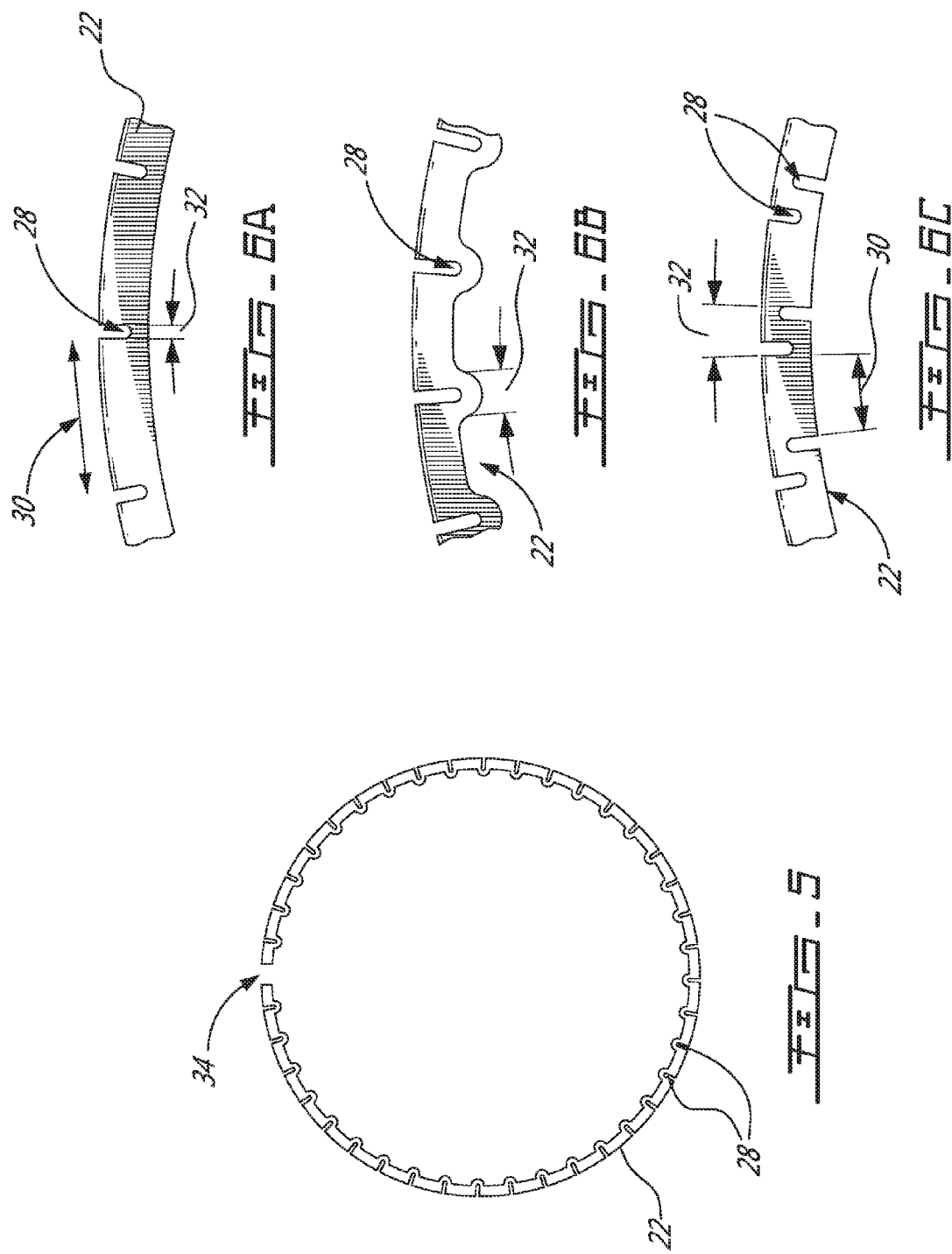

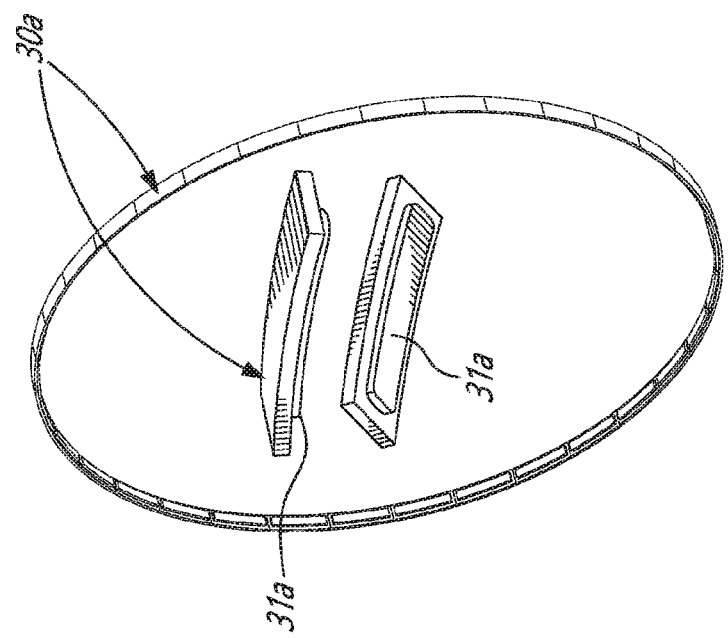
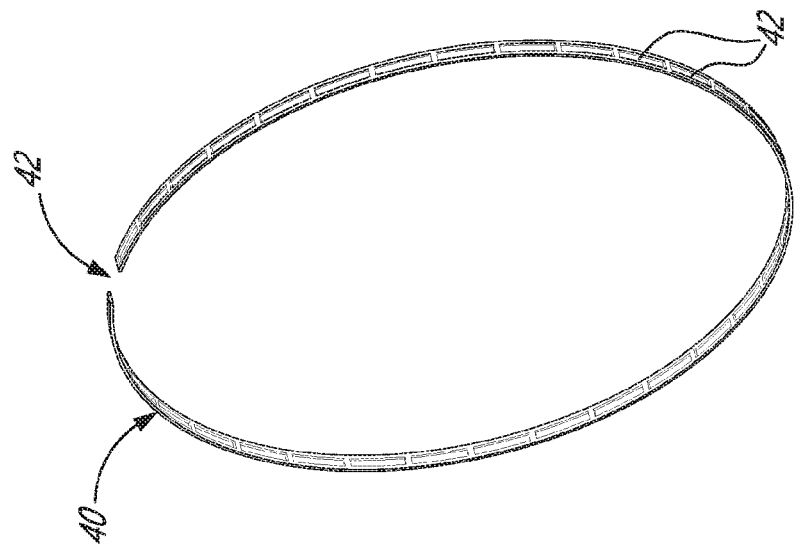
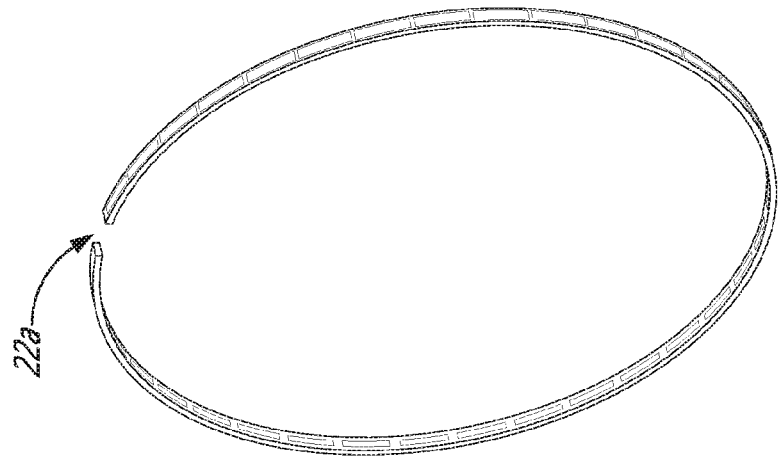

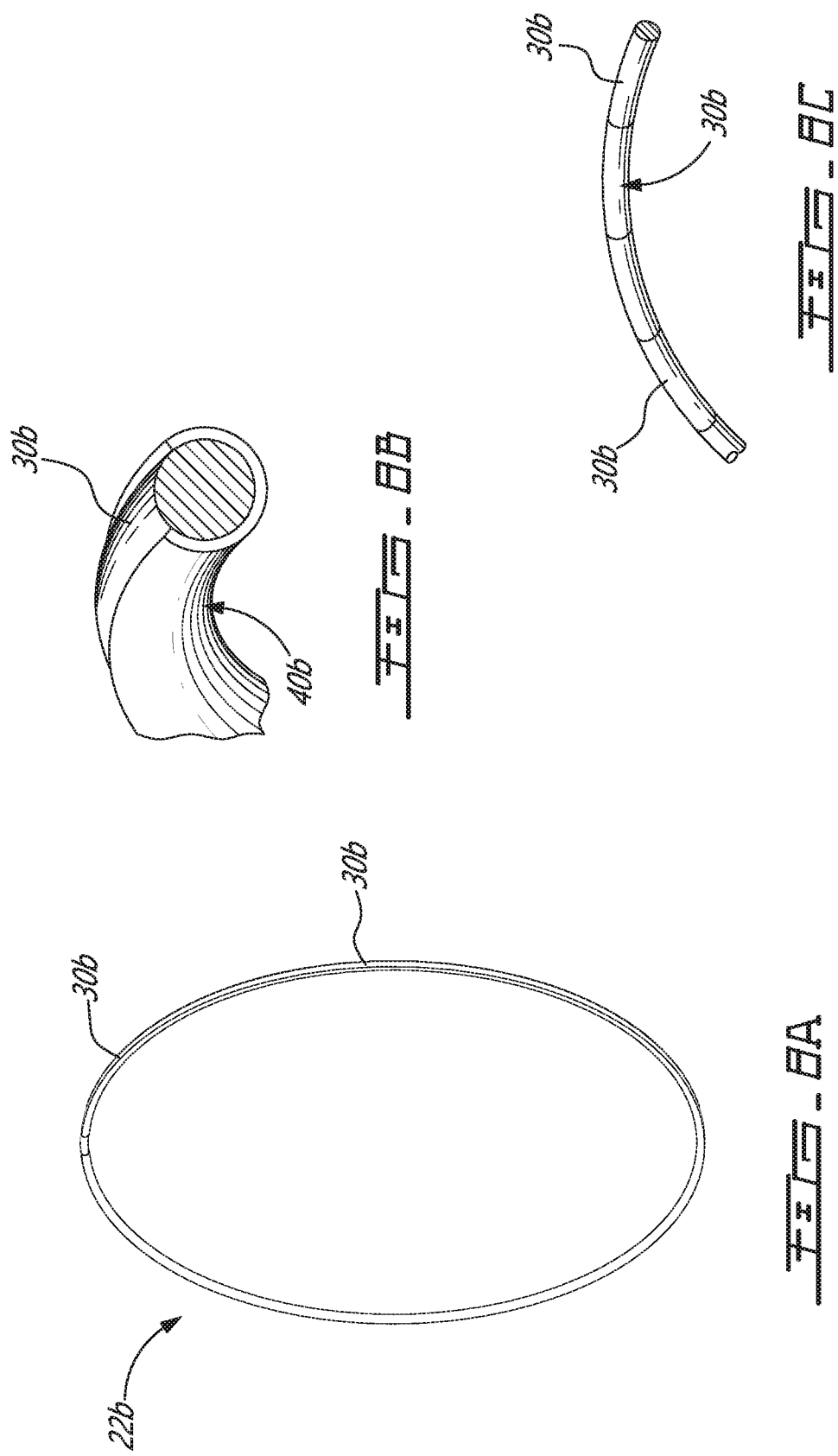

DAMPER RING

TECHNICAL FIELD

The application relates generally to gas turbine engines and, more particularly, to a damper ring arrangement.

BACKGROUND OF THE ART

Gas turbine engines contain rotating parts (e.g. turbine or compressor rotors, discs, seal runners, etc . . . ), which are in some cases subject to high vibrations and therefore require mechanical dampers to reduce vibratory stresses to provide adequate field life. Conventional dampers are typically provided in the form of a wire ring installed in a corresponding groove defined in the rotating part. Such ring dampers are subjected to centrifugal load that creates reaction force between the damper and the mating rotor part. In high speed applications, this force could be enough to stick the damper to the rotor by friction so that no relative sliding is maintained and damper effectiveness is lost because it deforms together with the rotor as one solid body. This phenomenon is referred to as damper lock by friction. When the damper effectiveness is lost, energy dissipation by the damper is significantly reduced resulting in rotor vibratory stress increase that reduces service life and could result in in-flight engine failure.

SUMMARY

In one aspect of an embodiment, there is provided a damper ring adapted to be mounted in frictional engagement with a radially inwardly facing surface of a circumferential groove defined in a rotary part of a gas turbine engine for providing vibration damping by friction forces; the damper ring comprising: a circumferentially segmented ring body having a non-uniform circumferential stiffness around its circumference including a locally reduced stiffness in a circumferential direction between each pair of circumferentially adjacent ring segments.

In another aspect, there is provided a gas turbine engine rotor mounted for rotation about an axis, the rotor comprising: a body defining a circumferentially extending groove for receiving a damper ring, the damper ring having an outer diameter engageable, when centrifugally loaded, in friction engagement with a radially inwardly facing surface of the circumferentially extending groove to provide energy dissipation by friction, the damper ring being circumferentially segmented into a plurality of ring segments, the ring segments being retained on an inner diameter of the damper ring by a circumferentially extending lip projecting from the body of the rotor, and wherein circumferentially spaced-apart lugs are provided on at least one of the ring segments and the circumferentially extending lip of the rotor to axially retain the ring segments in the circumferentially extending groove.

In a further aspect, there is provided a friction damper for frictional engagement with a radially inwardly facing surface of a circumferential groove defined in a rotary part of a gas turbine engine in order to provide energy dissipation by friction forces, the friction damper comprising: a damper ring having a discontinuous circumferential stiffness around its circumference, the damper ring including a plurality of ring segments, wherein at location between adjacent ring segments, the stiffness of the damper ring in a circumferential direction is less than that of each of the ring segments.

DESCRIPTION OF THE DRAWINGS

Reference is now made to the accompanying figures in which:

FIG. 1 is a schematic cross-sectional view of a gas turbine engine;

FIG. 5 is a front view of the segmented damper ring;

FIGS. 6a to 6c are enlarged views illustrating different possible cut-out configurations for the segmented damper ring shown in FIG. 5;

FIGS. 7a to 7c are isometric views of an alternate embodiment of the segmented damper ring;

FIGS. 8a to 8c are isometric views of another alternate embodiment of the segmented damper ring;

DETAILED DESCRIPTION

Figure 4:
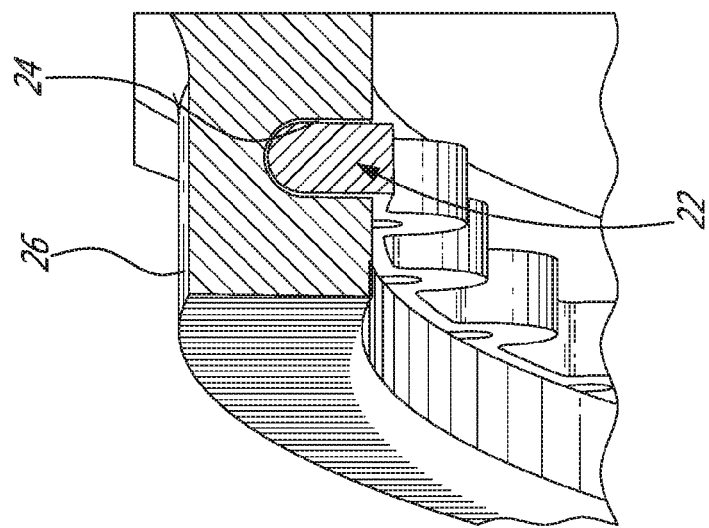
FIG. 4 is an enlarged cross-section view showing a segmented damper ring installed in a groove the rotor in accordance with an embodiment.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 having a combustion chamber 21 in which the compressed air is mixed with fuel and ignited for generating an annular stream of hot combustion gases, and a turbine section 18 for extracting energy from the combustion gases.

Figure 2:
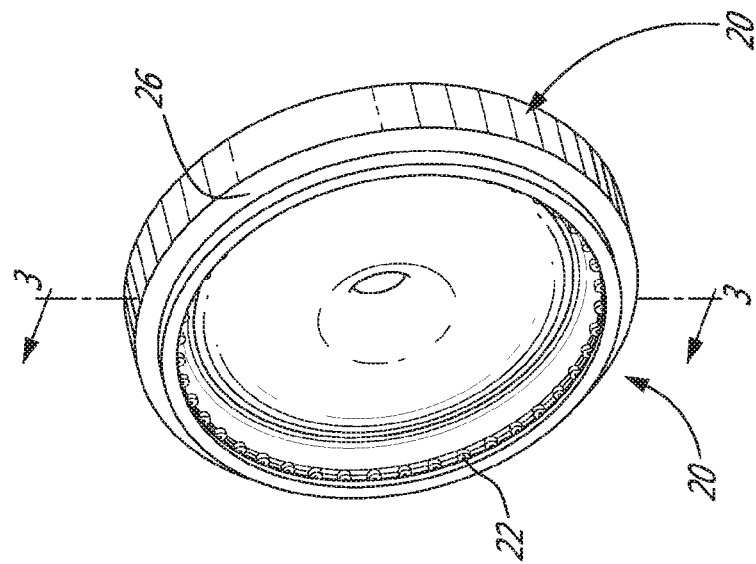
FIG. 2 is an isometric view of a rotor of the gas turbine engine.

FIG. 2 illustrates a rotary part or rotor 20 of the engine 10. The rotor 20 can take various forms. For instance, the rotor 20 can be a compressor or turbine disk, a seal runner, a turbine cover or any other rotary parts requiring vibration damping.

Figure 3:
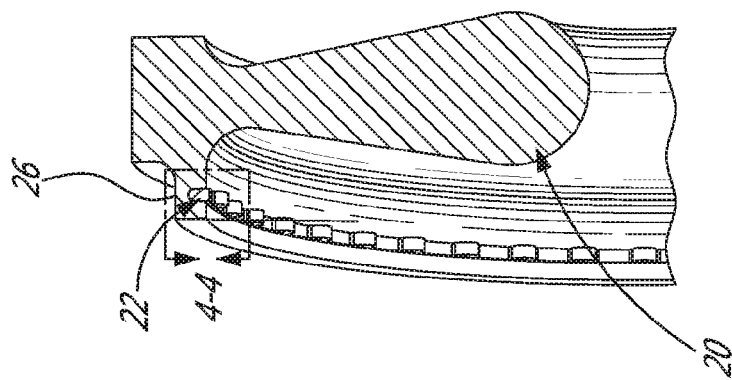
FIG. 3 is a cross-section taken along lines A-A in FIG. 2.

As shown in FIGS. 3 and 4, a friction damper, including at least one damper ring 22, may be mounted in an associated circumferential groove 24 defined in a annular flange 26 projecting axially from one face of the rotor 20. In use, the centrifugal load urges the damper ring 22 in frictional engagement with the radially inwardly facing surface (i.e. the circumferentially extending bottom wall) of the groove 24. Vibration energy is absorbed via sliding friction. The friction generated by the relative vibratory motion (i.e. the slippage in the circumferential direction between the damper ring 22 and the rotor 20) of the two surfaces that press against each other under the centrifugal loading is used as a source of energy dissipation. However, for the damping system to effectively work, some relative vibratory slippage between the damper ring 22 and the rotor 20 must be maintained during all phases of the operation of the engine 10. For high speed applications, like in small gas turbine engines, the centrifugal forces may become so high that the friction forces tend to lock the damper ring 22 in place in the groove 24, thereby preventing relative vibratory slippage in the circumferential direction between the ring 22 and the rotor 20. At high rotation speeds, the friction forces may become so high that the damper ring 22 basically sticks to the rotor 20. When the damper ring 22 sticks in the rotor groove 24, the rotor 20 and the ring 22 becomes like one solid body. In such a case, no more vibration damping is provided.

When the rotor 20 vibrates, the groove 24 is subject to vibratory deformation. In some areas, the groove 24 becomes compressed while in other areas it elongates. When the damper is locked by friction, if the groove 24 shrinks, the damper ring 22 compresses together with the groove 24 as one solid body. If the groove 24 elongates (the tensile strain increases in the circumferential direction), the damper ring 22 will elongate together with the groove as one solid body. Basically, when the damper ring is locked by friction, the friction forces elongate or compress the damper ring 22 in a circumferential direction so that circumferential vibratory strain of the damper is equal to circumferential vibratory strain of the mating groove at their points of contact around circumference. When it happens, if you take a cross-section at any point around the circumference of the damper ring 22, you will see that you have tensile or compression stresses and opposing internal tension or compression forces. However, if you cut the ring, at the cut or split location, then the internal forces will be zero. At this location, the equilibrium is broken as the ring 22 can no longer locally maintain the required internal tension and compression forces for the ring 22 to provide tension or compression of the damper ring 22 so that is complies with the deformation of the groove 24 in circumferential direction. As a result, the deformation of the ring 22 in the circumferential direction will not comply with the groove deformation in this same direction and the ring and groove respective circumferential vibratory strains will not be equal.—Non-equal vibratory circumferential strains (of damper ring 22 and groove 24) at this point of discontinuity mean that the ring 22 will slide relative to the groove 24 at this point, thereby providing friction damping. The sliding will spread in the circumferential direction from where the cut is made. Accordingly, by providing cuts at different circumferential locations around the circumference of the damper ring 22 sufficient sliding can be obtained from each split location to effectively provide vibration damping of the rotor. That is because at each split or cut location, the circumferential stiffness (i.e. the stiffness in the circumferential direction is zero) of the ring is zero or close to zero so that it is significantly less than the circumferential stiffness of the damper segments between splits.

It follows from the foregoing analysis of the damper ring behaviour, that the damper ring can be prevented from becoming locked by friction by designing a damper ring so that it has a non-uniform or interrupted circumferential stiffness around its circumference. This can, for instance, be achieved by circumferentially segmenting the damper ring.

Examples of such a segmented damper ring are shown in FIGS. 5 and 6a to 6c. From these figures, it can be appreciated that cut-outs 28 of different shapes can be made in a one piece ring to split the damper ring 22 into a plurality of ring segments 30 separated by low stiffness links 32. Indeed, the circumferential stiffness of the segments 30 is significantly higher than that of the inter-segment links 32 formed by the cut-outs 28. At the cut-out locations, the circumferential stiffness could be reduced significantly even to a value closed to zero (i.e. negligible value in comparison of the stiffness of the ring segments) by optimizing the cut-out shape. The cut-outs 28 may be defined in the inner or outer diameter of the ring or both. One cut-out 28 may be provided between each segment (FIGS. 6a, 6b) or the cut-outs 28 may be paired or grouped (FIG. 6c). The low stiffness links 32 may adopt various configurations. For instance, they may be straight (FIG. 6a), U-shape (FIG. 6b) or Z-shape (FIG. 6c).

As shown in FIG. 5, the ring can be split at one location 34 to ease installation in the rotor groove 24.

FIGS. 7a to 7c illustrate an embodiment in which the damper ring 22a comprises a plurality of separate ring segments 30a held together by an annular cage 40. The cage 40 defines a plurality of circumferentially spaced-apart seats 42 around its circumference for receiving the individual ring segments 30a. The cage 40 may take the form of a flat annular band of thin material with a circumferential array of through holes uniformly distributed around a circumference thereof for receiving the individual ring segments 30a. The ring segments 30a are mounted on the radially outer surface of the cage 40. Each individual ring segments 30a may have a hole engaging portion 31a projecting from the radially inner surface thereof for mating engagement with an associated one of the through holes in the cage 40. The cage 40 may be made of a different material than the ring segments 30a. The cage material may have a smaller modulus of elasticity than that of the segments. The web of material between adjacent through holes in the cage 40 is configured to have a low circumferential stiffness relative to the circumferential stiffness of the ring segments 30a. As shown in FIG. 7b, the cage 40 may be split at 42 to ease installation in the rotor groove 24.

FIGS. 8a to 8c illustrate another embodiment in which individual segments 30b of circular cross-section wire are held together by a C-shaped sheet metal cage housing 40b provided at the inner diameter of the assembled ring segments. The wire segments 30b are mounted end-to-end in the C-shaped cage housing 40b and projects radially outwardly therefrom for frictional engagement with the rotor groove 24. The individual segments 30b are free to move relative to the cage housing 40b. The cage housing 40b may be split to facilitate installation of the assembled segment damper ring 22b in the rotor groove 24.

Figure 9B:
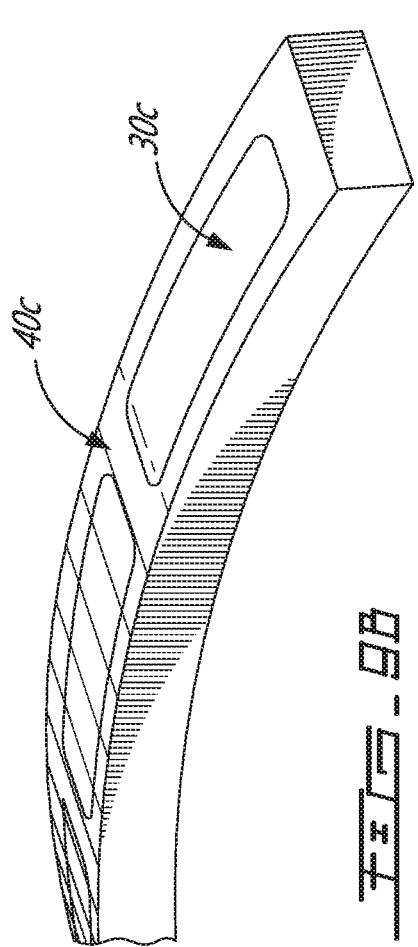
FIGS. 9a to 9c are isometric views of a further alternate embodiment of the segment damper ring.
Figure 9C:
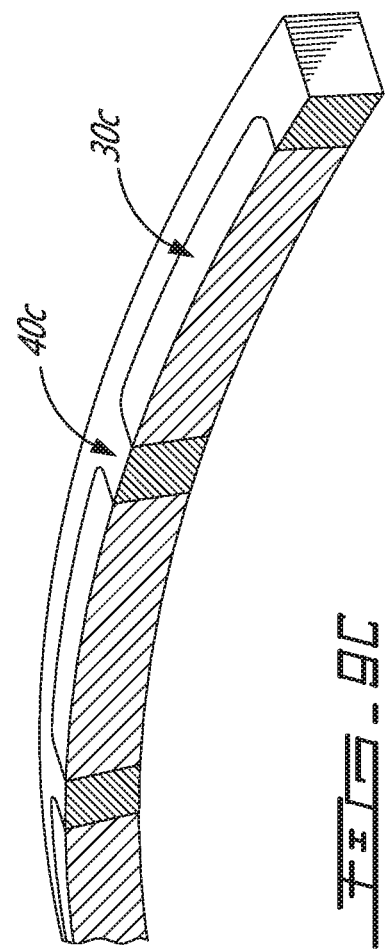
Figure 9A:
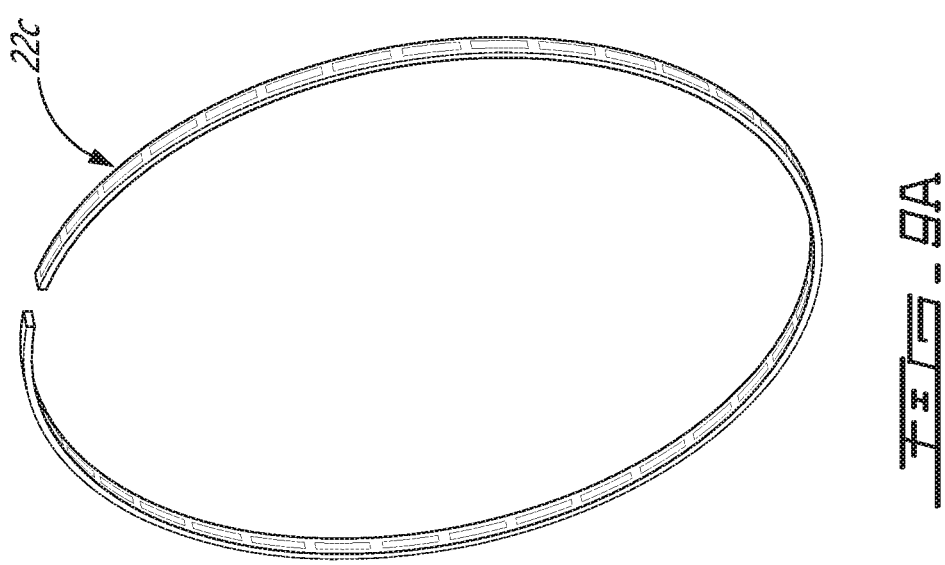

FIGS. 9a to 9c illustrate a further embodiment of a segmented damper ring 22c in which separate damper metal segments 30c can be molded inside a plastic cartridge 40c. Since the plastic has smaller modulus of elasticity than metal, it will provide low stiffness links between the damper segments 30c. This combination of material can be used in low temperature environment such as in the compressor section of the engine. Also it understood that other combination of materials could be used provided the cartridge has a smaller modulus of elasticity than the inserts.

Figure 10A:
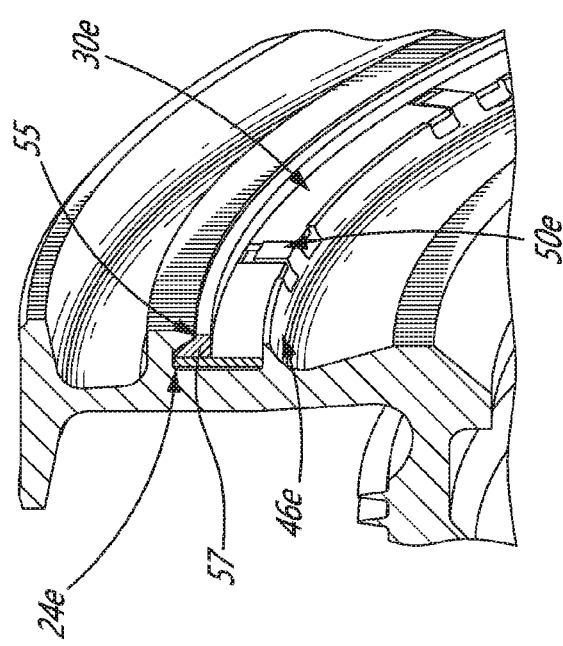
FIGS. 10a and 10b are isometric views illustrating a further embodiment of the segmented damper ring.
Figure 10B:
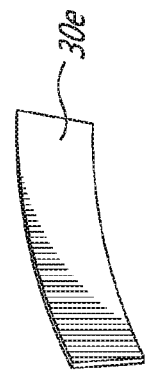
Figure 11A:
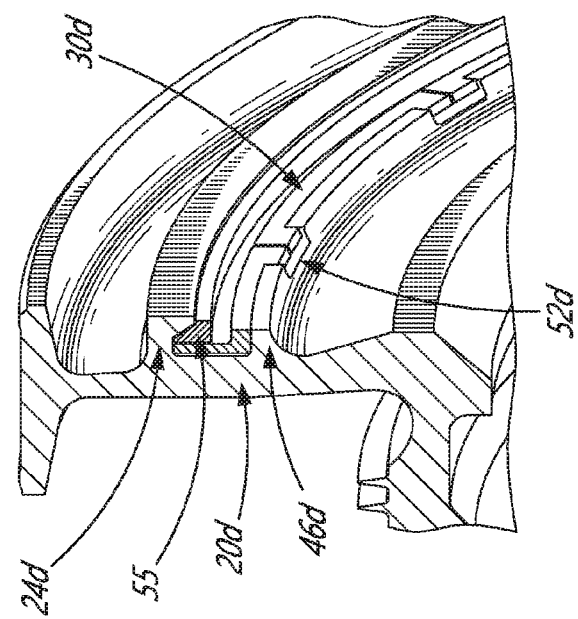
FIGS. 11a and 11b are isometric views illustrating a still further embodiment of the segmented damper ring.
Figure 11B:
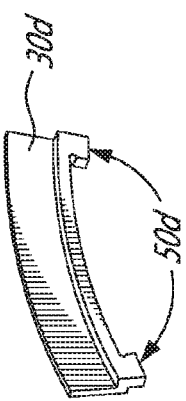

FIGS. 10a and 10b illustrate a further embodiment in which individual ring segments 30d are mounted directly to a groove 24d of a rotor 20d. The segmented ring is supported at an inner diameter thereof on a circumferentially extending lip 46d projecting axially from the rotor face. Lugs 50d depend radially inwardly from opposed end of each damper segment 30d for engagement in corresponding radial slots 52d defined in the rotor lip 46d. Alternatively, as show in FIGS. 11a and 11b, lugs 50e could be provided on the lip 46e instead of on the damper segments. The lugs 50d, 50e provide circumferential retention for the damper segments 30d, 30e. A retaining ring 55 is also engaged with the rotor groove 24d, 24e and the damper segments 30d, 30e to axially retain the segments in the groove. The retaining ring 55 may have a beveled annular flange 57 extending around its outer diameter for engagement with a corresponding beveled radial surface of the rotor groove 24d, 24e.

In use, at the locations of low or zero stiffness, the damper internal compressive or tensile vibratory force in the circumferential direction is zero (or close to zero depending on how low is the stiffness of the inter-segment links for the embodiments of FIGS. 5, 6a to 6c and 9a to 9c). Low or zero internal force results in low or zero vibratory circumferential strain at the damper ring surface mating with the rotor that, in turn, results in strain differential between the damper and the rotor, which translate into sliding. This sliding will spread from the point of zero/low damper stiffness over the sliding length where accumulation of the sliding friction force will cause the damper strain to be equal to the rotor strain at the mating surfaces. Behind this length, the damper ring will be locked by friction. Therefore, the length of the damper segments should be optimized to maximize the portion of the damper that is not locked by friction. This optimization should be done for each application taking in account actual friction coefficient, rotation speed and maximal allowable amplitude of vibration. According to one embodiment, an optimal design can be when a distance between two adjacent splits is equal to the sum of the sliding lengths at those splits or slightly less so that each damper segment will be in sliding over all its length. In order to further increase the damping effectiveness, the rotor groove for the damper ring should be placed on the rotor at an optimal location. Such an optimal groove location may be where the highest magnitude of the vibratory circumferential strain differential $\Delta\varepsilon$ will be achieved:

$$\Delta\varepsilon = |\varepsilon_{rotor} - \varepsilon_{damper\ bending}|, \text{ where}$$

$\varepsilon_{rotor}$ is the amplitude of the rotor vibratory circumferential strain in the groove at the damper ring contact location $\varepsilon_{damper\ bending}$ is the amplitude of the damper ring vibratory circumferential strain at the outer surface (where it contacts with the rotor groove) due to bending only. Damper bending is caused by vibratory displacements of the rotor groove where damper is installed.

As it can be seen from the above formula $\Delta\varepsilon$ is defined as absolute magnitude of the difference between $\varepsilon_{rotor}$ and $\varepsilon_{damper\ bending}$.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A damper ring adapted to be mounted in frictional engagement with a radially inwardly facing surface of a circumferential groove defined in a rotary part of a gas turbine engine for providing vibration damping by friction forces; the damper ring comprising: a circumferentially segmented ring body having a non-uniform circumferential stiffness around its circumference including a locally reduced stiffness between each pair of circumferentially adjacent ring segments, wherein the circumferentially segmented ring body comprises a plurality of separate ring segments held together by a cage, and wherein the cage is provided in the form of a C-shaped sheet metal cage provided on a radially inner side of the separate ring segments.

2. The damper ring of claim 1, wherein the circumferentially segmented ring body has alternating regions of high and low circumferential stiffness around its circumference.

3. The damper ring of claim 1, wherein the circumferentially segmented ring body comprises a plurality of ring segments having a first circumferential stiffness, wherein the circumferentially segmented ring body has a second circumferential stiffness at circumferential locations between adjacent ring segments, the second circumferential stiffness being less than the first circumferential stiffness.

4. The damper ring of claim 3, wherein at the circumferential locations between adjacent ring segments, the damper internal compressive or tensile vibratory forces in the circumferential direction are zero.

5. The damper ring of claim 1, wherein the circumferentially segmented ring body includes low stiffness links integrally formed between the circumferentially adjacent ring segments.

6. The damper ring of claim 1, wherein the stiffness of the cage in a circumferential direction is less than that of the separate ring segments.

7. The damper ring of claim 6, wherein the cage is provided in the form of an annular band having circumferentially spaced-apart seats defined therein for receiving the separate ring segments.

8. The damper ring of claim 1, wherein the separate ring segments have a circular cross-sectional shape and are abutted end-to-end within the C-shaped sheet metal cage.

9. A friction damper for frictional engagement with a radially inwardly facing surface of a circumferential groove defined in a rotary part of a gas turbine engine in order to provide energy dissipation by friction forces, the friction damper comprising: a damper ring having a discontinuous circumferential stiffness around its circumference, the damper ring including a plurality of ring segments, wherein at location between adjacent ring segments, the stiffness of the damper ring in a circumferential direction is less than that of each of the ring segments, the ring segments held together by a cage, the cage provided in the form of a C-shaped cage provided on a radially inner side of the plurality of ring segments.

* * * * *